(12) United States Patent
Burke et al.

(10) Patent No.: US 12,683,692 B2
(45) Date of Patent: Jul. 14, 2026

(54) EFFECTIVE RANGING SIGNAL RECOVERY FROM COHERENT IQ RECEIVER

(71) Applicant: Lumentum Operations LLC, San Jose, CA (US)

(72) Inventors: Daniel Burke, Vars (CA); Daniel John Wahl, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 290 days.

(21) Appl. No.: 18/617,120

(22) Filed: Mar. 26, 2024

(65) Prior Publication Data

US 2025/0253954 A1      Aug. 7, 2025

Related U.S. Application Data

(60) Provisional application No. 63/550,857, filed on Feb. 7, 2024.

(51) Int. Cl.
| | |
|---|---|
| *H04B 10/06* | (2006.01) |
| *H04B 10/2575* | (2013.01) |
| *H04B 10/61* | (2013.01) |

(52) U.S. Cl.
CPC ....... *H04B 10/61* (2013.01); *H04B 10/25759* (2013.01)

(58) Field of Classification Search
CPC .............. H04B 10/61; H04B 10/25759; H04B 10/25753; H04B 10/40; H04B 10/548; H04B 10/616; H04B 10/1123; H04B 10/1143; H04B 10/1149; H04B 10/613; G01S 7/4816; G01S 7/4817; G01S 17/497; G01S 17/10
USPC ....... 398/202, 203, 204, 205, 206, 207, 208, 398/209, 183, 188, 135, 139, 158, 159, 398/33, 38, 25, 26, 27, 127, 128, 129, 398/130, 131, 118, 119
See application file for complete search history.

(56) References Cited

U.S. PATENT DOCUMENTS

| | | | |
|---|---|---|---|
| 11,656,343 B2 * | 5/2023 | Crouch ................. | G01S 7/4817 |
| | | | 356/5.1 |
| 2018/0367219 A1 * | 12/2018 | Dar ......................... | H04B 10/58 |
| 2019/0339388 A1 * | 11/2019 | Crouch .................. | G08G 1/166 |

OTHER PUBLICATIONS

Kikuchi, Kazuro, "Fundamentals of Coherent Optical Fiber Communications," Journal of Lightwave Technology, Jan. 1, 2016, vol. 34, No. 1, pp. 157-179.

* cited by examiner

*Primary Examiner* — Hanh Phan
(74) *Attorney, Agent, or Firm* — Harrity & Harrity, LLP

(57) ABSTRACT

An optical ranging system includes a coherent IQ receiver configured to receive a radio frequency (RF)-encoded optical signal, generate an in-phase (I) electrical signal and a quadrature (Q) electrical signal based on the RF-encoded optical signal; a first analog-to-digital converter (ADC) configured to convert the I electrical signal into an I digital signal; a second ADC configured to convert the Q electrical signal into a Q digital; and a processing circuit configured to generate a power signal having the target frequency by squaring the I digital signal and the Q digital signal, and summing a squared I digital signal and a squared Q digital signal. The processing circuit is configured to analyze the power signal to determine a signal phase corresponding to signal peaks associated with the target frequency, and determine a distance value based on a phase difference between the signal phase and a reference power signal.

21 Claims, 6 Drawing Sheets

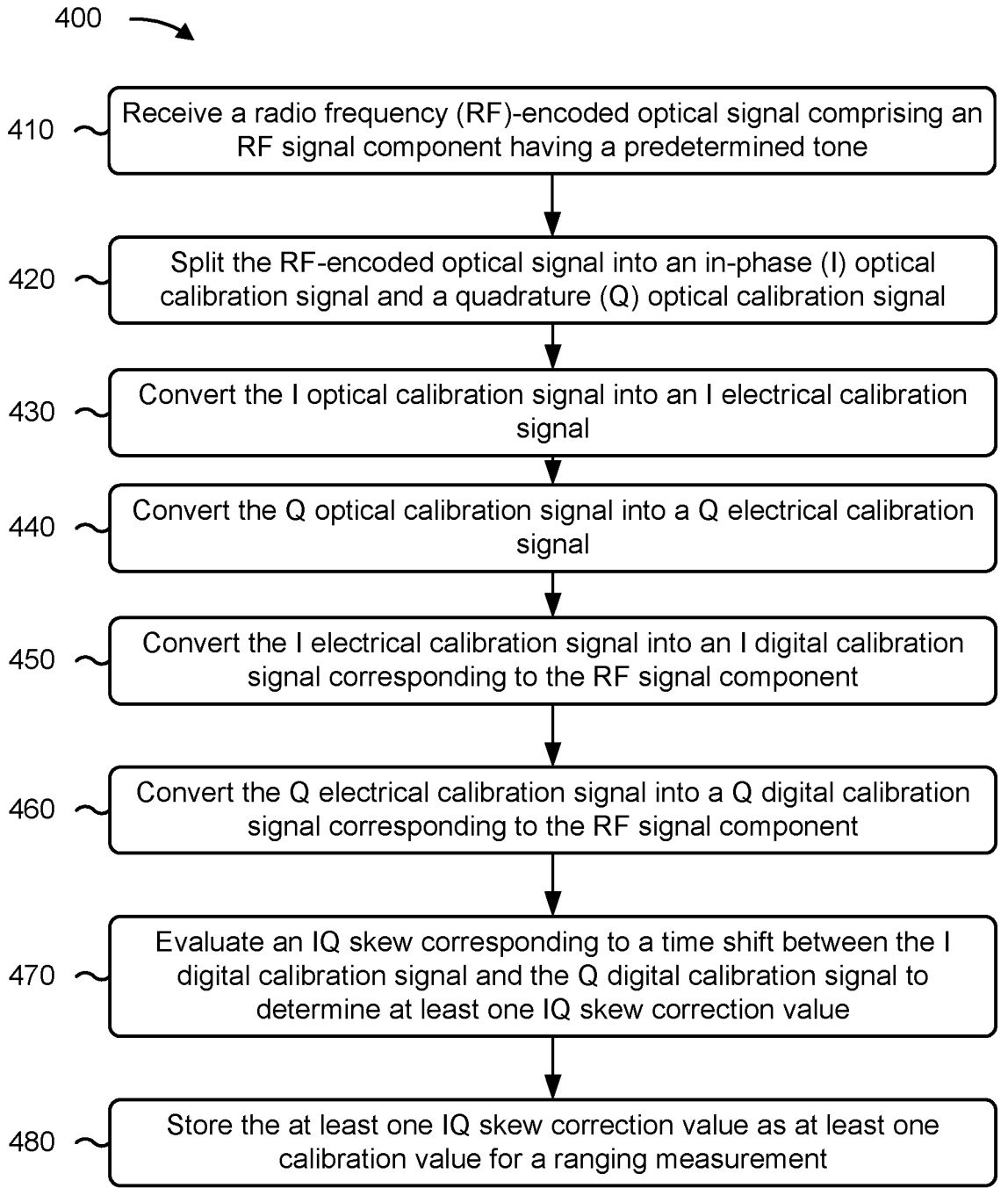

400

410 ～ Receive a radio frequency (RF)-encoded optical signal comprising an RF signal component having a predetermined tone 420 ～ Split the RF-encoded optical signal into an in-phase (I) optical calibration signal and a quadrature (Q) optical calibration signal 430 ～ Convert the I optical calibration signal into an I electrical calibration signal 440 ～ Convert the Q optical calibration signal into a Q electrical calibration signal 450 ～ Convert the I electrical calibration signal into an I digital calibration signal corresponding to the RF signal component 460 ～ Convert the Q electrical calibration signal into a Q digital calibration signal corresponding to the RF signal component 470 ～ Evaluate an IQ skew corresponding to a time shift between the I digital calibration signal and the Q digital calibration signal to determine at least one IQ skew correction value 480 ～ Store the at least one IQ skew correction value as at least one calibration value for a ranging measurement

FIG. 4

EFFECTIVE RANGING SIGNAL RECOVERY FROM COHERENT IQ RECEIVER

CROSS-REFERENCE TO RELATED APPLICATION

This Patent Application claims priority to U.S. Patent Application No. 63/550,857, filed on Feb. 7, 2024, and entitled "EFFECTIVE RANGING SIGNAL RECOVERY FROM COHERENT IQ RECEIVER." The disclosure of the prior Application is considered part of and is incorporated by reference into this Patent Application.

TECHNICAL FIELD

The present disclosure relates generally to optical ranging systems and to optical IQ receivers used in optical ranging systems.

BACKGROUND

A coherent optical receiver measures two signals, including an in-phase component (e.g., an I-component signal) and a quadrature component (e.g., a Q-component signal). The I-component signal and the Q-component signal may be collectively referred to as IQ signals. Thus, the two signals are two orthogonal components of a received signal. A 90° optical hybrid may be used to obtain the in-phase component and the quadrature component of the received signal. For example, a reference signal, such as a local oscillator (LO) signal, may be mixed with an incoming optical signal through the 90° optical hybrid producing photodetector currents for IQ components of the received signal. The in-phase component and the quadrature component are obtained simultaneously. The IQ signals are transformed into the digital domain by analog-to-digital converters (ADCs), and symbols are decoded by a digital signal processor (DSP).

For ranging applications, such as light detection and ranging (LIDAR), a multi-frequency signal, such as a radio frequency (RF) signal with multiple frequency components or tones, may be encoded onto an optical signal (e.g., a laser beam). The optical signal may be transmitted as a transmitted optical signal and reflected back (e.g., backscattered) by one or more objects in a scene as a reflected optical signal. The transmitted optical signal may be transmitted as a continuous wave, as opposed to discrete pulses. A coherent IQ receiver may calculate a distance to the one or more objects based on the reflected optical signal.

For example, in LIDAR systems, a light source transmits a light beam into a field of view and the light reflects from one or more objects by backscattering. For continuous wave modulation, such as that used for an amplitude-modulated continuous-wave (AMCW) beam, a delay of a detected wave after reflection is measured at the receiver. In the case of AMCW, an intensity pattern is encoded on the transmitted optical power of the optical signal, such as a linear RF chirp or a multi-frequency sine wave generated by a local oscillator. For AMCW, a free-space path encodes a phase shift on the RF signal, which can be detected by measuring an intermediate frequency after mixing a received intensity signal with a non-delayed electronic version of the transmitted RF signal (e.g., a local oscillator signal). Thus, distance can be determined from the measured phase shift. This is in contrast to pulsed modulation, in which a system measures distance to a 3D object by measuring the absolute time that a light pulse takes to travel from a source into the 3D scene and back, after reflection.

SUMMARY

In some implementations, an optical ranging system includes a coherent IQ receiver configured to receive an RF-encoded optical signal comprising an RF signal component that has a frequency that is half of a target frequency, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal; a first ADC configured to convert the I electrical signal into an I digital signal encoded with the RF signal component; a second ADC configured to convert the Q electrical signal into a Q digital signal encoded with the RF signal component; and a processing circuit configured to generate a power signal having the target frequency, wherein the processing circuit is configured to square the I digital signal and the Q digital signal to generate a squared I digital signal and a squared Q digital signal, respectively, and sum the squared I digital signal and the squared Q digital signal to generate the power signal, and wherein the processing circuit is configured to determine a distance value based on a phase difference between the power signal and a reference power signal.

In some implementations, an optical ranging system includes a coherent IQ receiver configured to receive an RF-encoded optical signal encoded with an RF pattern based on a plurality of RF signal components having different frequencies, wherein the coherent IQ receiver comprises a coherent IQ demodulator configured to split the RF-encoded optical signal into an I optical signal and a Q optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal; a first ADC configured to convert the I electrical signal into an I digital signal; a second ADC configured to convert the Q electrical signal into a Q digital signal; and a processing circuit configured to square the I digital signal and the Q digital signal to generate a squared first I digital signal and a squared first Q digital signal, respectively, and sum the squared first I digital signal and the squared first Q digital signal to generate a power signal having a plurality of signal peaks, wherein the processing circuit is configured to analyze the power signal to determine a first signal phase corresponding to first signal peaks associated with a first target frequency and to determine a second signal phase corresponding to second signal peaks associated with a second target frequency that is different from the first target frequency, wherein the processing circuit is configured to determine a first distance value based on a first phase difference between the first signal phase and a reference power signal, and wherein the processing circuit is configured to determine a second distance value based on a second phase difference between the second signal phase and the reference power signal.

In some implementations, an optical ranging system includes a coherent IQ receiver configured to receive an RF-encoded optical signal encoded with an RF pattern based on a plurality of RF signal components having different frequencies, wherein the coherent IQ receiver comprises a coherent IQ demodulator configured to split the RF-encoded optical signal into an I optical signal and a Q optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal; a first ADC configured to convert the I electrical signal into an I digital signal; a second ADC configured to convert the Q electrical signal into a Q digital signal; and a processing circuit configured to apply a first time interpolation to at least one of the I digital signal or the Q digital signal based on at least one first IQ skew correction value to generate a first pair of IQ signals with a first IQ skew corresponding to a first target frequency compensated, wherein the processing circuit is configured to apply a second time interpolation to at least one of the I digital signal or the Q digital signal based on at least one second IQ skew correction value to generate a second pair of IQ signals with a second IQ skew corresponding to a second target frequency compensated, wherein the processing circuit is configured to square the first pair of IQ signals to generate a squared first I digital signal and a squared first Q digital signal, and sum the squared first I digital signal and the squared first Q digital signal to generate a first power signal having a first plurality of signal peaks, wherein the processing circuit is configured to square the second pair of IQ signals to generate a squared second I digital signal and a squared second Q digital signal, and sum the squared second I digital signal and the squared second Q digital signal to generate a second power signal having a second plurality of signal peaks, wherein the processing circuit is configured to analyze the first power signal to determine a first signal phase corresponding to first signal peaks associated with the first target frequency, wherein the processing circuit is configured to analyze the second power signal to determine a second signal phase corresponding to second signal peaks associated with the second target frequency, wherein the processing circuit is configured to determine a first distance value based on a first phase difference between the first signal phase and a reference power signal, and wherein the processing circuit is configured to determine a second distance value based on a second phase difference between the second signal phase and the reference power signal.

BRIEF DESCRIPTION OF THE DRAWINGS

FIG. 4 is a flowchart of an example process associated with IQ skew correction in an optical ranging system.

DETAILED DESCRIPTION

Figure 1:
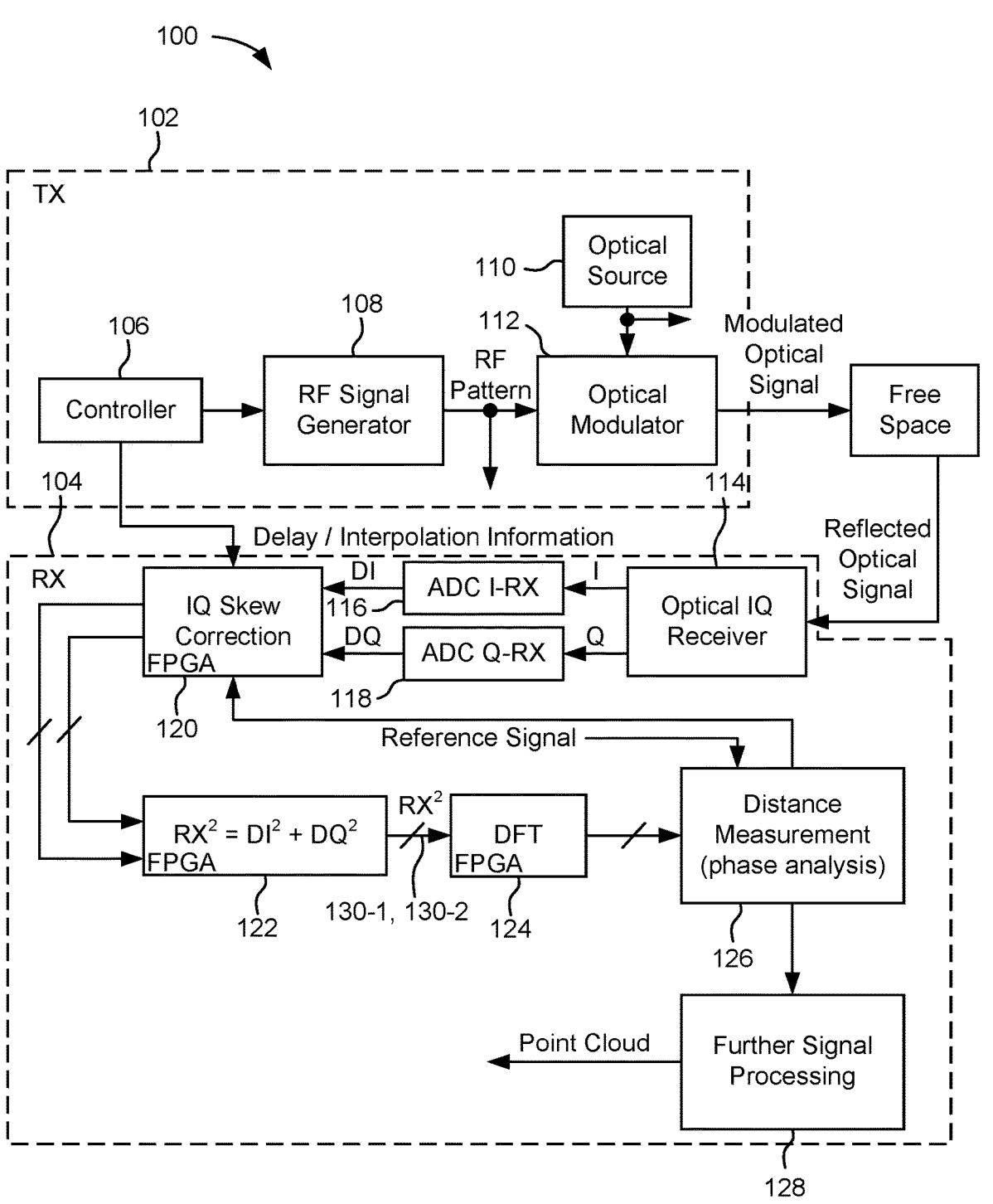
FIG. 1 shows an optical ranging system according to one or more implementations.

The following detailed description of example implementations refers to the accompanying drawings. The same reference numbers in different drawings may identify the same or similar elements.

In an optical ranging system, an optical signal may be encoded with an RF pattern that includes one or more tones or frequency components, referred to as RF signal components. The RF-encoded optical signal may be transmitted into an environment to obtain distance measurements via reflection. For example, the RF signal components of a reflected RF-encoded optical signal may be evaluated at a receiver side of the optical ranging system to obtain the distance measurements. The reflected RF-encoded optical signal may be received by an optical IQ receiver and split into an in-phase (I) signal component (an I signal) and a quadrature (Q) signal component (a Q signal) for calculating distance information. When recovering a signal in I and Q, there may be an optical phase between the I and Q signals. For example, during transmission, there may be an ambiguous number of pattern inversions, and a signal magnitude may be arbitrarily split in quadrature (of varying degrees, evolving over time) between the I signal component and the Q signal component. The optical phase may corrupt a retrieval of information from either of the I signal and/or the Q signal. Thus, while the optical phase is not of interest in terms of ranging and obtaining the distance measurements, the optical phase may corrupt the recovery of the signal used for performing a distance measurement. Additionally, the optical phase can wander significantly during a single measurement and may be too fast to be tracked. In other words, the optical phase may change over time and may be too fast to measure directly to be compensated for in the distance measurement. In optical ranging systems, the optical phase and speed of phase rotation may be completely arbitrary, and the optical phase can have non-continuous jumps, making phase tracking infeasible. Moreover, a cost and a power dissipation of high-speed DSPs which can correct for optical phase changes may be prohibitive to be used in an optical ranging system.

In addition, the I and Q signals may have frequencies above a Nyquist rate of one or more ADCs used for sampling, which causes the I and Q signals at higher RF frequencies to be subsampled (e.g., undersampled). As a result, aliasing may affect a recovery of a signal.

In addition, for ranging purposes, it is important that certain requirements are met, such as a timing of the I and Q measurements being exactly coincident and that electrical path lengths for both I and Q signal paths being a same length. However, these requirements are not practical in real-world applications due to imperfect components and/or errors resultant from manufacturing (e.g., due to manufacturing tolerances), which often result in an IQ skew (e.g., phase shift or phase misalignment) between respective RF signal components of the I and Q signals. Thus, a mechanism may be needed to time match (e.g., phase match or phase align) respective RF signal components of the I and Q signals during signal recovery. An IQ skew should be corrected for each individual RF frequency that is to be recovered, since each RF signal component may have an IQ skew unique to that RF signal component or RF frequency. Thus, for distance measurements that involve multiple RF frequencies, multiple IQ skew corrections should be performed.

Some implementations provide a method to remove an ambiguity caused by an optical phase difference between I and Q signals that may corrupt distance information by squaring each of the I and Q signals and summing the squares of the I and Q signals. For example, a power of each I and Q signal may be squared, and the powers of the squared signals may be summed together to obtain a combined IQ signal (e.g., a power signal). By squaring and summing the I and Q signals, the ambiguity caused by the optical phase difference between I and Q signals can be removed and the I and Q signals can be combined into one receiver signal, which may simplify a recovery of the distance information. However, the squaring of the I and Q signals changes a property of the I and Q signals and changes the dominant frequencies of the I and Q signals. As a result, a transmitter that transmits a transmitted optical signal should be calibrated to give the I and Q signals the correct properties and dominant frequencies that are desired after squaring. In other words, the transmitter should be calibrated to generate an RF pattern that results in desired frequency components or tones that are produced after the squaring of the I and Q signals. In addition, the transmitter should be calibrated to generate the RF pattern that does not produce interference frequency components and/or aliased frequency components at frequencies at which the desired frequency components are to be located.

With proper analysis, the transmitter can be configured to generate a transmitted optical signal, or TX signal, that has frequencies of interest, to aid in ranging an object, when the I and Q signals are squared. Thus, important information can be recovered while removing the ambiguities in the I and Q signals caused by the optical phase difference.

Since the I and Q signals are time-domain signals, squaring the I and Q signals is mathematically equivalent to convolving a Fourier transform of the time-domain signal with itself (e.g., self-convolution). Squaring a sine wave results in a doubling of a frequency of the sine wave. Thus, if a 2 GHz sine wave is desired as a target detection frequency, a 1 GHz sine wave should be transmitted. During detection at the receiver, the signal with the 1 GHz frequency will be squared, and the squaring has an effect of doubling the frequency to the target detection frequency of 2 GHz.

In a more complicated situation involving several sine waves of different frequencies encoded onto the transmitted optical signal, simulations may be used to determine where new frequency peaks will be located after the squaring of the IQ signals (e.g., after the self-convolution) such that the new frequency peaks are located at the target detection frequencies. Simulations may also take subsampling into account to ensure that aliased frequency peaks are not located at one of the target detection frequencies. Thus, through simulation or computer-aided design, an RF pattern generated by the transmitter may be configured such that, after squaring (self-convolution) at the receiver, the recovered signal will have frequency peaks at desired locations (e.g., at the target detection frequencies) and interference peaks and/or aliased frequency peaks are located away from the target detection frequencies.

Squaring the I and Q signals makes a ranging method appear more like a direct type detection method, since the optical phase is being removed and only the total combined power of the I and Q signals is being detected. However, coherent detection may be beneficial in two ways. First, a coherent optical receiver may be insensitive to wavelengths of light that are different from a wavelength of the optical signal. Thus, non-coherent light and background interference may be rejected by the coherent optical receiver, which is not possible in a direct type detection method. Second, an amplitude sensitivity may be doubled because the transmitted optical signal may be an AMCW modulated signal (e.g., a signed AMCW signal) with an amplitude of the RF pattern that fluctuates between an amplitude range of [−1, 1] (normalized). The AMCW modulated signal may be modulated using binary phase shift keying (BPSK). As a result, a detector circuit of the receiver may have a dynamic range for detection because the transmitted optical signal is a signed signal that has both positive and negative amplitudes. Thus, amplitudes in an amplitude range of [−1,1] can be recovered.

Additionally, or alternatively, some implementations described in this disclosure provide a method for correcting timing errors (e.g., IQ skews) between the I and Q signals, on a tone-by-tone basis or frequency-by-frequency basis. The method may include time interpolating between ADC timings of either the I signal, the Q signal, or both the I and Q signals in small or incremental amounts until information from the I signal and the Q signal match (e.g., until respective RF components of the I and Q signals match or are in phase alignment). That is, during calibration, distances reported by the I and Q digital signals to a given target for a given tone of interest (e.g., a target detection frequency) may be measured. Several different time interpolation values may be used to shift the I digital signal and/or the Q digital signal relative in time to each other. After checking the calculated distances of several different time interpolations, a time interpolation value that gives an agreement between the I and Q digital signals may be selected as a correct IQ skew interpolation value.

The IQ skew may require different IQ skew correction values for each tone. Thus, each tone of interest may be IQ skew corrected individually, giving each tone a respective local replica of the ADC samples. The IQ skew correction method may be used to correct the IQ skew for any number of tones of interest to provide effective signal recovery.

FIG. 1 shows an optical ranging system 100 according to one or more implementations. The optical ranging system 100 may be a light detection and ranging (LIDAR) system configured to perform ranging measurements (e.g., distance measurements) based on transmitted light signals. The optical ranging system 100 may include a transmitter 102 and a receiver 104. In some implementations, the transmitter 102 may be a coherent transmitter that includes transmitter analog coherent optics (ACO) and the receiver 104 may be a coherent receiver that includes receiver ACO. In some implementations, the transmitter 102 and the receiver 104 may share one or more components. For example, a controller and/or a local oscillator may be utilized by both the transmitter 102 and the receiver 104. In some implementations, "calibration signal" may be used to refer to a signal that is used during a calibration operation of the optical ranging system 100, and "measurement signal" may be used to refer to a signal that is used during a measurement operation that is performed after the calibration operation. In other words, a measurement operation may be performed during a normal run-time of the optical ranging system 100 to obtain ranging measurements from an environment that may be used for generating a point cloud and/or for object detection.

The transmitter 102 may include a controller 106, an RF signal generator 108, an optical source 110, and an optical modulator 112. The controller 106 may generate one or more control signals used to control one or more parameters of the RF signal generator 108. For example, the controller 106 may provide a clock signal to the RF signal generator 108. In some implementations, the controller 106 may be implemented as a field-programmable gate array (FPGA). The RF signal generator 108 may generate an RF signal that has an RF pattern (e.g., an intensity pattern) generated based on the one or more control signals. For example, the RF signal generator 108 may include a local oscillator (LO) configured to generate the RF signal based on one or more parameters provided by the one or more control signals. The RF signal may include one or more RF signal components. Each RF signal component may have a different frequency or tone.

In some implementations, the RF signal generator 108 may generate an RF signal with a single RF signal component, such as a single sine wave. In some implementations, the RF signal generator 108 may generate an RF signal with a plurality of RF signal components. For example, the RF signal generator 108 may combine the plurality of RF signal components to generate the RF signal with a desired RF pattern. The RF signal generator 108 may generate a multiple-sine wave that forms the RF pattern. The multiple-sine wave may be formed by combining a plurality of sine waves of different frequencies that are superimposed to form the RF pattern. In some implementations, a copy of the RF signal (e.g., a copy of an LO signal generated by the local oscillator) or a portion of the RF signal may be provided to the receiver 104. Thus, a replica of the RF signal may be provided to the receiver 104 for use in calibration and/or measurement operations. For example, the replica of the RF signal may be used as a reference signal for one or more operations.

The optical source 110 may generate an optical signal for transmission. For example, the optical source may be a laser source and the optical signal may be a laser beam. The optical source 110 may provide the optical signal to the optical modulator 112 prior to transmission. The optical modulator may encode or otherwise modulate the optical signal with the RF signal provided by the RF signal generator. Thus, the RF pattern of the RF signal may be encoded onto the optical signal, and the optical modulator 112 may transmit the modulated optical signal into free space as an RF-encoded optical signal. In some implementations, the RF-encoded optical signal is an AMCW signal. In some implementations, the RF-encoded optical signal is a signed AMCW signal that has both positive and negative amplitude peaks. In some implementations, the optical modulator 112 may be a Mach-Zehnder modulator. The receiver 104 may receive the RF-encoded optical signal as a reflected optical signal from an object located in free space.

Multiple frequencies may be encoded onto an optical signal for improving an accuracy of a distance measurement. For example, a first frequency of the first RF signal component may define a ranging (measurement) distance of the optical ranging system 100. A second frequency of the second RF signal component may define a coarse measurement resolution of the optical ranging system 100. A third frequency of a third RF signal component may define a fine measurement resolution of the optical ranging system 100. The first frequency may be lower than the second frequency, and the second frequency may be lower than the third frequency. Thus, the first frequency may correspond to a longest wavelength that defines the ranging (measurement) distance of the optical ranging system 100, and one or more higher frequencies may be used to improve the measurement resolution or accuracy of a distance measurement.

The receiver 104 may include optical IQ receiver 114, a first ADC 116, a second ADC 118, an IQ skew correction circuit 120, a signal combiner 122, a discrete Fourier transform (DFT) processing component 124, a distance measurement processing component 126, and a further signal processing component 128. The components of the receiver 104 arranged downstream from the first ADC 116 and the second ADC 118 may be implemented in a digital signal processor (DSP) or other digital signal processing circuitry. In some implementations, the digital signal processing circuitry may be implemented, at least in part, by an FPGA. For example, the IQ skew correction circuit 120, the signal combiner 122, and the DFT processing component 124 may be implemented in an FPGA. The signal combiner 122 may be optional. Thus, in some implementations, the signal combiner 122 may not be present. The distance measurement processing component 126 and a further signal processing component 128 may be implemented in one or more processors.

The optical IQ receiver 114 may receive the RF-encoded optical signal as the reflected optical signal. The optical IQ receiver 114 may include an IQ demodulator that splits the RF-encoded optical signal into an I optical calibration signal and a Q optical calibration signal. In some implementations, the optical IQ receiver 114 may be a coherent IQ receiver and the IQ demodulator may be a coherent IQ demodulator, such as a 90° optical hybrid. The coherent IQ demodulator may receive a portion of the optical signal or an optical local oscillator signal from the optical source 110 or another local oscillator source for splitting the RF-encoded optical signal into the I optical calibration signal and the Q optical calibration signal and for rejecting non-coherent light and background interference. The optical IQ receiver 114 may also include photodetectors that convert the I optical calibration signal and the Q optical calibration signal into photocurrents, and transimpedance amplifiers (TIAs) that convert the photocurrents into corresponding voltages. Thus, the optical IQ receiver 114 may convert the I optical calibration signal and the Q optical calibration signal into corresponding electrical signals (e.g., an I electrical calibration signal corresponding to the I optical calibration signal and a Q electrical calibration signal corresponding to the Q optical calibration signal).

The first ADC 116 may convert the I electrical calibration signal into an I digital calibration signal DI that is encoded with the RF pattern that has been phase shifted based on a distance to the object. The second ADC 118 may convert the Q electrical signal into a Q digital signal DQ that is encoded with the RF pattern that has been phase shifted based on the distance to the object. Thus, the first ADC 116 and the second ADC 118 may sample the voltages generated by the TIAs at a sampling rate to generate the I and Q digital signals, respectively.

The IQ skew correction circuit 120 may evaluate one or more IQ skews in order to determine one or more IQ skew correction values for each IQ skew. The IQ skew correction circuit 120 may evaluate an IQ skew for each RF signal component (e.g., for each frequency or tone) of the RF pattern generated by the RF signal generator 108. In some implementations, each RF signal component may correspond to a different target detection frequency used for determining a measurement distance to the object. The IQ skew correction circuit 120 may include one or more time interpolators that are used to delay or advance a timing (or phase) of a respective signal. The IQ skew correction circuit 120 may receive delay or time interpolation information from the controller 106 for performing one or more time interpolations.

As an example, the IQ skew correction circuit 120 may evaluate a first IQ skew corresponding to a first RF signal component of the plurality of RF signal components based on the I digital calibration signal and the Q digital calibration signal to generate at least one first IQ skew correction value corresponding to the first RF signal component. Additionally, the IQ skew correction circuit 120 may evaluate a second IQ skew corresponding to a second RF signal component of the plurality of RF signal components based on the I digital calibration signal and the Q digital calibration signal to generate at least one second IQ skew correction value corresponding to the second RF signal component. The IQ skew correction circuit 120 may apply a first time interpolation for evaluating the first IQ skew, and may apply a second time interpolation for evaluating the second IQ skew.

After determining the at least one first IQ skew correction value, the IQ skew correction circuit 120 may store the at least one first IQ skew correction value in memory as calibration values to be used for a ranging measurement. Similarly, after determining the at least one second IQ skew correction value, the IQ skew correction circuit 120 may store the at least one second IQ skew correction value in the memory as calibration values to be used for the ranging measurement. For example, during a measurement operation, the at least one first IQ skew correction value may be applied by the IQ skew correction circuit 120 to correct an IQ skew of the first RF signal component of two IQ digital signals, and the at least one second IQ skew correction value may be applied by the IQ skew correction circuit 120 to correct an IQ skew of the second RF signal component of the two IQ digital signals. The IQ skew correction circuit 120 may evaluate an IQ skew for each RF signal component (e.g., each frequency or tone) to derive one or more IQ skew correction values for each RF signal component, and then separately apply the one or more IQ skew correction values to the IQ digital signals for correcting the IQ skew for that RF signal component during a measurement operation. Thus, the IQ skew correction circuit 120 may generate a pair of IQ skew corrected signals for each RF signal component during the measurement operation based on respective calibration values.

The first IQ skew may be a first phase difference (e.g., a first time shift) between the first RF signal component of the I digital calibration signal and the first RF signal component of the Q digital calibration signal. The second IQ skew may be a second phase difference (e.g., a second time shift) between the second RF signal component of the I digital calibration signal and the second RF signal component of the Q digital calibration signal.

Any small path length or timing difference in the receiver 104, from reception through the ADCs 116 and 118 at the FPGA, may result in a time shift of the IQ signals relative to each other. Differences in sampling rates or sampling times (e.g., ADC timing errors) between the first ADC 116 and the second ADC 118 may also cause a time shift of the digital IQ signals relative to each other. A source of the IQ skew (e.g., TIAs, path lengths, ADC timing errors) is irrelevant to the IQ skew correction, since all error sources may be removed with a same IQ skew correction algorithm. The IQ skew correction algorithm may be programmed into hardware (e.g., programmed into the FPGA). The IQ skew correction may not be perfect, since the method may involve linearly interpolating a sine function. Thus, the method may introduce numerical errors since a sine function is not linear. Nevertheless, the method may be satisfactory for any single tone that is to be recovered from an incoming optical signal. To recover multiple frequencies (or tones), the original IQ streams may be replicated, and an IQ skew correction may be determined for each tone of interest. That is, each tone to be recovered may be time interpolated separately to obtain an IQ skew interpolation value for that tone.

As described above, the IQ skew correction circuit 120 may apply a first time interpolation for evaluating the first IQ skew corresponding to a first frequency, and may apply a second time interpolation for evaluating the second IQ skew corresponding to a second frequency. In some implementations, the IQ skew correction circuit 120 may apply a third time interpolation for evaluating a third IQ skew corresponding to the third frequency.

The IQ skew correction circuit 120 may include a processing circuit that determines the at least one first IQ skew correction value such that the first IQ skew is minimized, and determines the at least one second IQ skew correction value such that the second IQ skew is minimized. Each first IQ skew correction value and each second IQ skew correction value may be a respective time interpolation value. In other words, each first IQ skew correction value and each second IQ skew correction value may be a time shift value that can be applied to minimize the first IQ skew and the second IQ skew, respectively. In some implementations, the IQ skew correction values are used to reduce the first IQ skew and the second IQ skew to zero or to a value below an acceptable threshold.

The IQ skew correction circuit 120 may use the signal combiner 122, the DFT processing component 124, and the distance measurement processing component 126 to evaluate the IQ skew of each RF signal component. The IQ skew correction circuit 120 may generate a pair of time interpolated IQ signals for each RF signal component to be evaluated. Each pair of time interpolated IQ signals may be provided to the signal combiner 122. The signal combiner 122 may generate a total power signal $Rx^2$ for each pair of time interpolated IQ signals by squaring the pair of time interpolated IQ signals (e.g., squaring the I digital signal and the Q digital signal of the pair) to generate a squared I digital calibration signal and a squared Q digital calibration signal, and summing the squared I digital calibration signal and the squared Q digital calibration signal of that pair. By squaring and summing the I and Q digital signals, an ambiguity caused by an optical phase difference between the I and Q signals can be removed and the I and Q digital signals can be combined into one power signal.

A DFT may be applied by the DFT processing component 124 to each total power signal $Rx^2$ to extract a desired frequency component from a respective total power signal $Rx^2$. Thus, the DFT processing component 124 may recover one or more RF signal components of the RF pattern from a total power signal $Rx^2$. For example, the total power signal $Rx^2$ corresponding to the first RF signal component may be processed by the DFT processing component 124 to extract the first RF signal component corresponding to a first frequency.

A phase difference (e.g., a phase delay) between a received RF signal component and a corresponding transmitted RF signal component may correspond to a transit time for a transmitted/reflected optical signal. Using the speed of light, the distance measurement processing component 126 may calculate a distance to an object based on the phase difference and/or transit time. The distance measurement processing component 126 may evaluate a phase difference of the first RF signal component extracted from the respective total power signal $Rx^2$ and a reference power signal to obtain a first distance value corresponding to the first RF signal component. Additionally, the total power signal $Rx^2$ corresponding to the second RF signal component may be processed by the DFT processing component 124 to extract the second RF signal component corresponding to a second frequency. The distance measurement processing component 126 may evaluate a phase difference of the second RF signal component extracted from the respective total power signal $Rx^2$ and the reference power signal to obtain a second distance value corresponding to the second RF signal component. Thus, the distance measurement processing component 126 may include one or more comparators for measuring phase differences, and a processor for calculating a distance value for each phase difference. This delay corresponds to a transit time for the transmitted laser light, as the laser light passes from the modulator to the target and back to the RX. Using the speed of light, the processing circuitry can calculate a distance to the object.

Multiple iterations may be applied by the IQ skew correction circuit 120 with different time interpolation values to shift the IQ digital signals relative to each other in time to determine a correct IQ skew correction value for a respective RF signal component. After evaluating distance values resultant from the different time interpolations, a time interpolation value that provides an agreement between the I-component signal and the Q-component signals may be selected by the IQ skew correction circuit 120 as a correct skew interpolation value for that RF signal component.

In some implementations, the distance measurement processing component 126 may obtain a plurality of distance measurements for a respective pair of IQ digital signals that have been time interpolated by the IQ skew correction circuit 120. Each distance measurement may correspond to a different set of time interpolation values applied to the respective pair of IQ digital signals. The distance measurement processing component 126 may generate a distribution of I phase/distance, and Q phases, and may indicate when an I distribution average agrees with an Q distribution-average. The set of time interpolation values that correspond to an agreement between the I distribution average and the Q distribution-average may be selected and used by the IQ skew correction circuit 120 as IQ skew correction values (e.g., time interpolation values) for correcting an IQ skew for a particular RF signal component (e.g., a particular frequency or tone).

In some implementations, a distance to the object is known during the calibration operation. Thus, the distance measurement processing component 126 may obtain a plurality of distance measurements for a respective pair of IQ digital signals that have been time interpolated by the IQ skew correction circuit 120. Each distance measurement may correspond to a different set of time interpolation values applied to the respective pair of IQ digital signals. The distance measurement processing component 126 may generate a distance distribution with a standard deviation based on a combination of the pair of IQ digital signals. The set of time interpolation values that provide a tightest distance distribution to the known distance may be selected and used by the IQ skew correction circuit 120 as IQ skew correction values (e.g., time interpolation values) for correcting an IQ skew for a particular RF signal component (e.g., a particular frequency or tone).

During a measurement operation (e.g., performed after a calibration operation), the transmitter 102 may transmit and the receiver 104 may receive a second RF-encoded optical signal comprising the plurality of RF signal components used during the calibration operation. The IQ demodulator of the optical IQ receiver 114 may split the second RF-encoded optical signal into an I optical measurement signal and a Q optical measurement signal. The photodetectors and TIAs of the optical IQ receiver 114 may generate an I electrical measurement signal corresponding to the I optical measurement signal, and generate a Q electrical measurement signal corresponding to the Q optical measurement signal. The first ADC 116 may convert the I electrical measurement signal into an I digital measurement signal, and the second ADC may convert the Q electrical measurement signal into a Q digital measurement signal.

The IQ skew correction circuit 120 may perform an IQ skew correction on the I digital measurement signal and the Q digital measurement signal for each target detection frequency. For example, the IQ skew correction circuit 120 may apply a first time interpolation to at least one of the I digital measurement signal or the Q digital measurement signal based on the at least one first IQ skew correction value to generate a first pair of IQ skew corrected signals. The signal combiner 122 may generate, subsequent to the first time interpolation, a first total power signal 130-1 based on the first pair of IQ skew corrected signals. The DFT processing component 124 may extract the first RF signal component corresponding to the first frequency from the first total power signal 130-1. The distance measurement processing component 126 may determine a first distance value based on a first phase difference between the first total power signal 130-1 and the reference power signal.

In addition, the IQ skew correction circuit 120 may apply a second time interpolation to at least one of the I digital measurement signal or the Q digital measurement signal based on the at least one second IQ skew correction value to generate a second pair of IQ skew corrected signals. The signal combiner 122 may generate, subsequent to the second time interpolation, a second total power signal 130-2 based on the second pair of IQ skew corrected signals. The DFT processing component 124 may extract the second RF signal component corresponding to the second frequency from the second total power signal 130-2. The distance measurement processing component 126 may determine a second distance value based on a second phase difference between the second total power signal 130-2 and the reference power signal.

The signal combiner 122 may generate the first total power signal 130-1 by squaring the first pair of IQ skew corrected signals to generate a squared first I digital measurement signal and a squared first Q digital measurement signal, and summing the squared first I digital measurement signal and the squared first Q digital measurement signal. In addition, the signal combiner 122 may generate the second total power signal 130-2 by squaring the second pair of IQ skew corrected signals to generate a squared second I digital measurement signal and a squared second Q digital measurement signal, and summing the squared second I digital measurement signal and the squared second Q digital measurement signal. As a result, an ambiguity caused by an optical phase difference between the I and Q signals can be removed for each pair of IQ signals, and the I and Q digital signals for each pair of IQ signals can be combined into one power signal.

As indicated above, FIG. 1 is provided as an example. Other examples may differ from what is described with regard to FIG. 1. The number and arrangement of devices and components shown in FIG. 1 are provided as an example. In practice, there may be additional devices or components, fewer devices or components, different devices or components, or differently arranged devices or components than those shown in FIG. 1.

Figure 2:
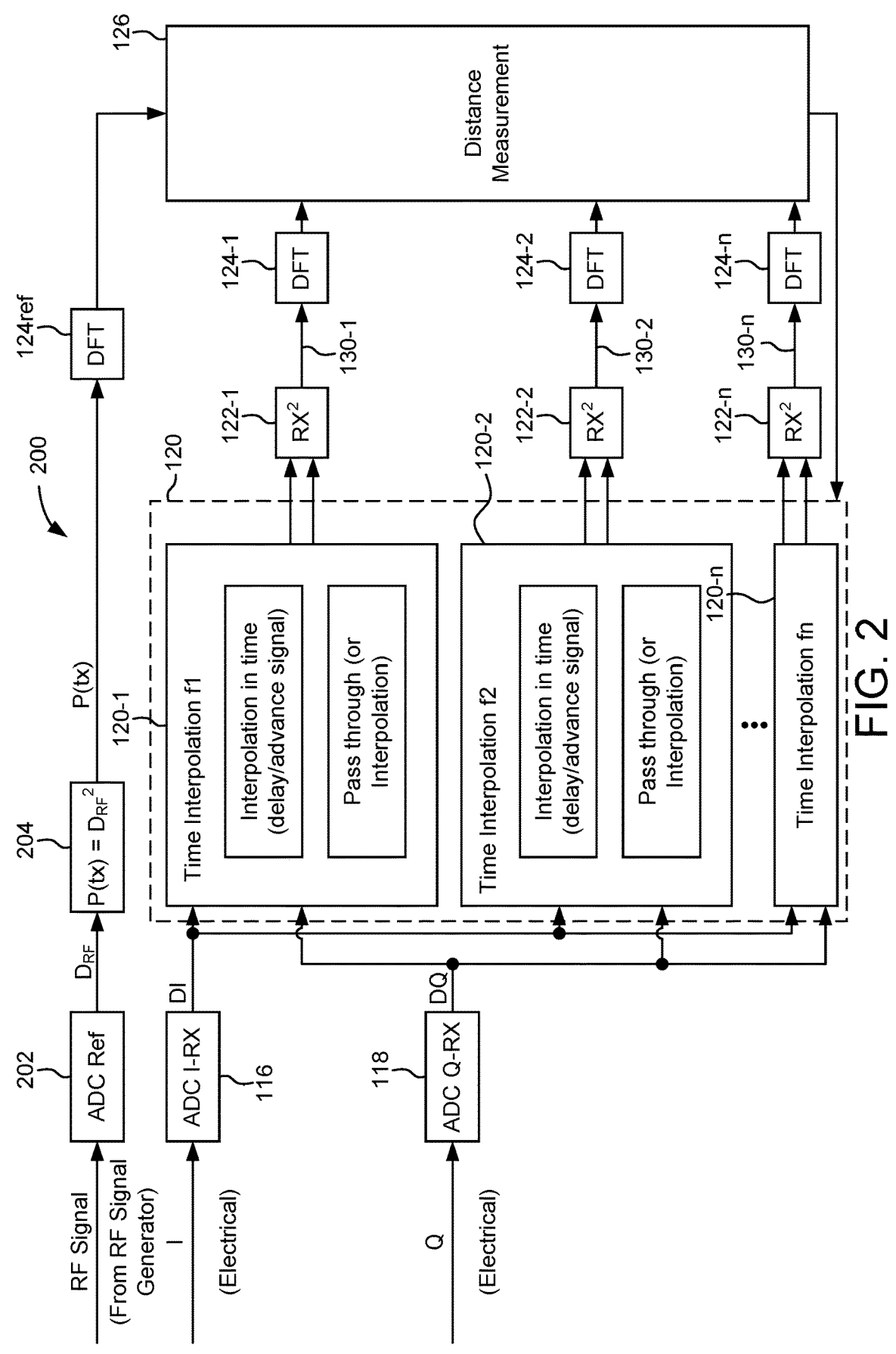
FIG. 2 shows a processing circuit according to one or more implementations.

FIG. 2 shows a processing circuit 200 according to one or more implementations. The processing circuit 200 may be implemented in the receiver 104 described in connection with FIG. 1. The processing circuit 200 may include a reference ADC 202 and a reference power signal generator 204. The processing circuit 200 may further include the IQ skew correction circuit 120, multiple signal combiners 122-1, 122-2, . . . , 122-n, multiple DFT processing components 124-1, 124-2, . . . , 124-n, and the distance measurement processing component 126. Here, "n" may represent a number of different frequencies, which may correspond to different RF signal components of the RF signal generated by the RF signal generator 108. For example, a first frequency f1 may correspond to a first RF signal component, a second frequency f2 may correspond to a second RF signal component, and an n$^{th}$ frequency fn may correspond to an n$^{th}$ RF signal component.

The reference ADC 202 may receive a replica of the RF signal generated by the RF signal generator 108 and convert the RF signal into a digital signal DRF. The reference power signal generator 204 may square the digital signal DRF to generate a reference power signal P(tx) that represents a power of the RF signal encoded onto the optical signal by the transmitter 102. The reference power signal generator 204 may provide the reference power signal P(tx) to a DFT processing component 124ref, which may apply a DFT to the reference power signal P(tx) to extract one or more reference RF signal components (e.g., reference frequency components) from the reference power signal P(tx). Each reference RF signal component may correspond to a frequency or tone of interest. The distance measurement processing component 126 may use the extracted reference RF signal components for phase difference determinations. In some implementations, a reference power signal may be generated by tapping or splitting a portion of the RF-encoded optical signal prior to transmitting the RF-encoded optical signal into free space.

The IQ skew correction circuit 120 may include n time interpolation circuits 120-1, 120-2, . . . , 120-n. Each time interpolation circuit 120-1, 120-2, . . . , 120-n may include two time interpolation channels for separately processing the IQ digital signals. In other words, each time interpolation circuit 120-1, 120-2, . . . , 120-n may receive the I digital signal DI and the Q digital signal DQ.

During a calibration operation, the time interpolation circuit 120-1 may be used by the processing circuit 200 to evaluate a first IQ skew by adjusting a first relative time shift (e.g., a first phase shift) between the I digital calibration signal DI and the Q digital calibration signal DQ a first plurality of times to generate different first relative time shifts between the I digital calibration signal DI and the Q digital calibration signal DQ. In some implementations, the time interpolation circuit 120-1 may time interpolate the I digital calibration signal DI a first plurality of times with different first time interpolation values (e.g., different time shifts or phase shifts) and pass through the Q digital calibration signal DQ with no time shift in order to adjust the first relative time shift. In some implementations, the time interpolation circuit 120-1 may time interpolate the Q digital calibration signal DQ a first plurality of times with different first time interpolation values (e.g., different time shifts or phase shifts) and pass through the I digital calibration signal DI with no time shift in order to adjust the first relative time shift. In some implementations, the time interpolation circuit 120-1 may time interpolate the I digital calibration signal DI and the Q digital calibration signal DQ a first plurality of times with different sets of first time interpolation values in order to adjust the first relative time shift. In other words, both the I digital calibration signal DI and the Q digital calibration signal DQ may be time interpolated to obtain different first relative time shifts.

The signal combiner 122-1 may receive a first pair of IQ signals from the time interpolation circuit 120-1 and generate the first total power signal 130-1 based on squaring and summing the first pair of IQ signals. The DFT processing component 124-1 may apply a DFT to the first total power signal 130-1 to extract the first RF signal component from the first total power signal 130-1. The distance measurement processing component 126 may determine an optimal first relative time shift, among the different first relative time shifts, that provides a first phase alignment or a closest phase alignment between the I digital calibration signal and the Q digital calibration signal relative to the first RF signal component, and determine one or more first time shift values associated with the optimal first relative time shift as the at least one first IQ skew correction value. The time interpolation circuit 120-1 may be configured to apply the at least one first IQ skew correction value for correcting the IQ skew of the I digital measurement signal and the Q digital measurement signal relative to the first RF signal component during a measurement operation.

When both the I digital calibration signal DI and the Q digital calibration signal DQ are time interpolated by the time interpolation circuit 120-1, the distance measurement processing component 126 may determine which set of first time interpolation values among the different sets of first time interpolation values provides a first phase alignment or a closest phase alignment between the I digital calibration signal and the Q digital calibration signal relative to the first RF signal component, and set the set of first time interpolation values as the first IQ skew correction values. The time interpolation circuit 120-1 may be configured to apply the first IQ skew correction values for correcting the IQ skew of the I digital measurement signal and the Q digital measurement signal relative to the first RF signal component during a measurement operation.

Similarly, the time interpolation circuit 120-2 may be used by the processing circuit 200 to evaluate a second IQ skew by adjusting a second relative time shift (e.g., a second phase shift) between the I digital calibration signal DI and the Q digital calibration signal DQ a second plurality of times to generate different second relative time shifts between the I digital calibration signal DI and the Q digital calibration signal DQ. In some implementations, the time interpolation circuit 120-2 may time interpolate the I digital calibration signal DI a second plurality of times with different second time interpolation values (e.g., different time shifts or phase shifts) and pass through the Q digital calibration signal DQ with no time shift in order to adjust the second relative time shift. In some implementations, the time interpolation circuit 120-2 may time interpolate the Q digital calibration signal DQ a second plurality of times with different second time interpolation values (e.g., different time shifts or phase shifts) and pass through the I digital calibration signal DI with no time shift in order to adjust the second relative time shift. In some implementations, the time interpolation circuit 120-2 may time interpolate the I digital calibration signal DI and the Q digital calibration signal DQ a second plurality of times with different sets of second time interpolation values in order to adjust the second relative time shift. In other words, both the I digital calibration signal DI and the Q digital calibration signal DQ may be time interpolated to obtain different second relative time shifts.

The signal combiner 122-2 may receive a second pair of IQ signals from the time interpolation circuit 120-2 and generate a second total power signal 130-2 based on squaring and summing the second pair of IQ signals. The DFT processing component 124-2 may apply a DFT to the second total power signal 130-2 to extract the second RF signal component from the second total power signal 130-2. The distance measurement processing component 126 may determine an optimal second relative time shift among the different second relative time shifts that provides a second phase alignment or a closest phase alignment between the I digital calibration signal and the Q digital calibration signal relative to the second RF signal component, and determine one or more second time shift values associated with the optimal second relative time shift as the at least one second IQ skew correction value. The time interpolation circuit 120-2 may be configured to apply the at least one second IQ skew correction value for correcting the IQ skew of the I digital measurement signal and the Q digital measurement signal relative to the second RF signal component during a measurement operation.

When both I digital calibration signal DI and the Q digital calibration signal DQ are time interpolated by the time interpolation circuit 120-2, the distance measurement processing component 126 may determine which set of second time interpolation values among the different sets of second time interpolation values provides a second phase alignment or a closest phase alignment between the I digital calibration signal and the Q digital calibration signal relative to the second RF signal component, and set the set of second time interpolation values as the second IQ skew correction values. The time interpolation circuit 120-2 may be configured to apply the second IQ skew correction values for correcting the IQ skew of the I digital measurement signal and the Q digital measurement signal relative to the second RF signal component during the measurement operation.

The different first relative time shifts, the different first time interpolation values, and the different sets of first time interpolation values may be used to evaluate the IQ skew corresponding to the first RF signal component. The different second relative time shifts, the different second time interpolation values, and the different sets of second time interpolation values may be used to evaluate the IQ skew corresponding to the second RF signal component. As a result, the different first time interpolation values may be different from the different second time interpolation values, and the different sets of first time interpolation values may be different from the different sets of second time interpolation values.

During a measurement operation, the first ADC 116 may convert an I electrical signal into an I digital signal DI, and the second ADC may to convert a Q electrical signal into a Q digital signal DQ. The time interpolation circuit 120-1 may apply a first time interpolation to at least one of the I digital signal DI or the Q digital signal DQ based on at least one first IQ skew correction value to generate a first pair of IQ signals with a first IQ skew corresponding to a first target frequency being compensated. In addition, the time interpolation circuit 120-2 may apply a second time interpolation to at least one of the I digital signal DI or the Q digital signal DQ based on at least one second IQ skew correction value to generate a second pair of IQ signals with a second IQ skew corresponding to a second target frequency being compensated. As a result, the signal combiner 122-1 may receive the first pair of IQ signals after IQ skew compensation, and the signal combiner 122-2 may receive the second pair of IQ signals after IQ skew compensation.

The signal combiner 122-1 may square the first pair of IQ signals to generate a squared first I digital signal and a squared first Q digital signal, and sum the squared first I digital signal and the squared first Q digital signal to generate the first power signal 130-1 having a first plurality of signal peaks. The signal combiner 122-2 may square the second pair of IQ signals to generate a squared second I digital signal and a squared second Q digital signal, and sum the squared second I digital signal and the squared second Q digital signal to generate the second power signal 130-2 having a second plurality of signal peaks.

The DFT processing component 124-1 may analyze the first power signal 130-1 to determine a first signal phase corresponding to first signal peaks associated with the first target frequency. The DFT processing component 124-2 may analyze the second power signal 130-2 to determine a second signal phase corresponding to second signal peaks associated with the second target frequency.

The distance measurement processing component 126 may determine a first distance value based on a first phase difference between the first signal phase and the reference power signal P(tx), and may determine a second distance value based on a second phase difference between the second signal phase and the reference power signal P(tx).

The transmitter 102 may be a coherent transmitter configured to combine the plurality of RF signal components for encoding the optical signal such that the first power signal 130-1 has the first signal peaks at the first target frequency and the second power signal 130-2 has the second signal peaks at the second target frequency. For example, the RF signal generator 108 may combine the plurality of RF signal components to generate the RF signal with a desired RF pattern such that the first power signal 130-1 has the first signal peaks at the first target frequency and the second power signal 130-2 has the second signal peaks at the second target frequency. The desired RF pattern may be adapted by the controller 106 such that aliased signal peaks that occur due to subsampling do not occur at or interfere with signal peaks of any target frequency. Thus, the desired RF pattern may be adapted by the controller 106 such that aliased signal peaks do not occur at or interfere with the first signal peaks at the first target frequency and the second signal peaks at the second target frequency.

As indicated above, FIG. 2 is provided as an example. Other examples may differ from what is described with regard to FIG. 2. The number and arrangement of devices and components shown in FIG. 2 are provided as an example. In practice, there may be additional devices or components, fewer devices or components, different devices or components, or differently arranged devices or components than those shown in FIG. 2.

Figure 3:
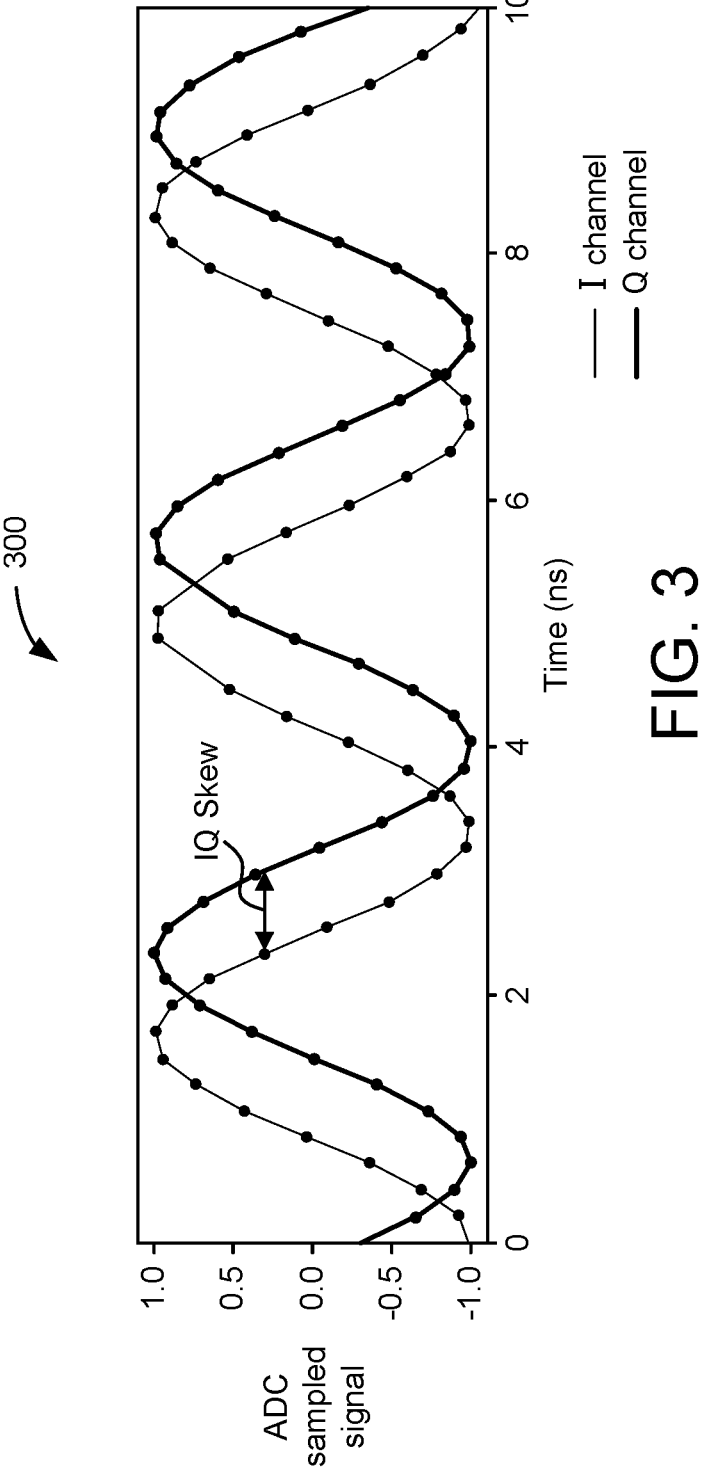
FIG. 3 shows a signal diagram according to one or more implementations.

FIG. 3 shows a signal diagram 300 according to one or more implementations. The signal diagram 300 shows an RF signal component encoded onto the I digital signal DI and a same RF signal component encoded onto the Q digital signal DQ prior to IQ skew correction. Thus, the RF signal component of the I digital signal DI is time shifted (e.g., phase shifted) relative to the RF signal component of the Q digital signal DQ. The IQ skew correction circuit 120 (e.g., the time interpolation circuit 120-1) may apply an IQ skew correction value determined during a calibration operation to the I digital signal DI in order to minimize or otherwise reduce the time shift between the RF signal component of the I digital signal DI and the RF signal component of the Q digital signal DQ. Additionally, or alternatively, the IQ skew correction circuit 120 (e.g., the time interpolation circuit 120-1) may apply an IQ skew correction value determined during the calibration operation to the Q digital signal DQ in order to minimize or otherwise reduce the time shift between the RF signal component of the I digital signal DI and the RF signal component of the Q digital signal DQ. In some implementations, the RF signal component of the I digital signal DI and/or the RF signal component of the Q digital signal DQ may be time shifted by the IQ skew correction circuit 120 to be in complete phase alignment with each other. IQ skews may be separately corrected in this manner for each RF signal component (e.g., for each frequency or tone of interest).

As indicated above, FIG. 3 is provided as an example. Other examples may differ from what is described with regard to FIG. 3.

FIG. 4 is a flowchart of an example process 400 associated with IQ skew correction in an optical ranging system. In some implementations, one or more process blocks of FIG. 4 are performed by a receiver (e.g., receiver 104). Additionally, or alternatively, one or more process blocks of FIG. 4 may be performed by one or more components of the receiver 104.

As shown in FIG. 4, process 400 may include receiving an RF-encoded optical signal comprising an RF signal component having a predetermined tone (block 410). For example, the optical IQ receiver 114 may receive the RF-encoded optical signal comprising the RF signal component having a predetermined tone, as described above.

As further shown in FIG. 4, process 400 may include splitting the RF-encoded optical signal into an I optical calibration signal and a Q optical calibration signal (block 420). For example, the optical IQ receiver 114 may split the RF-encoded optical signal into the I optical calibration signal and the Q optical calibration signal, as described above.

As further shown in FIG. 4, process 400 may include converting the I optical calibration signal into an I electrical calibration signal (block 430). For example, the optical IQ receiver 114 may convert the I optical calibration signal into an I electrical calibration signal, as described above.

As further shown in FIG. 4, process 400 may include converting the Q optical calibration signal into a Q electrical calibration signal (block 440). For example, the optical IQ receiver 114 may convert the Q optical calibration signal into a Q electrical calibration signal, as described above.

As further shown in FIG. 4, process 400 may include converting the I electrical calibration signal into an I digital calibration signal corresponding to the RF signal component (block 450). For example, the first ADC 116 may convert the I electrical calibration signal into the I digital calibration signal corresponding to the RF signal component, as described above.

As further shown in FIG. 4, process 400 may include converting the Q electrical calibration signal into a Q digital calibration signal corresponding to the RF signal component (block 460). For example, the second ADC 118 may convert the Q electrical calibration signal into the Q digital calibration signal corresponding to the RF signal component, as described above.

As further shown in FIG. 4, process 400 may include evaluating an IQ skew corresponding to a time shift between the I digital calibration signal and the Q digital calibration signal to determine at least one IQ skew correction value (block 470). For example, the IQ skew correction circuit 120 and the distance measurement processing component 126 may cooperatively evaluate an IQ skew corresponding to a time shift between the I digital calibration signal and the Q digital calibration signal to determine at least one IQ skew correction value, as described above.

As further shown in FIG. 4, process 400 may include storing the at least one IQ skew correction value as at least one calibration value for a ranging measurement (block 480). For example, the distance measurement processing component 126 may store the at least one IQ skew correction value as at least one calibration value for a ranging measurement, as described above.

Process 400 may include additional implementations, such as any single implementation or any combination of implementations described below and/or in connection with one or more other processes described elsewhere herein.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

Figures 5A, 5B:
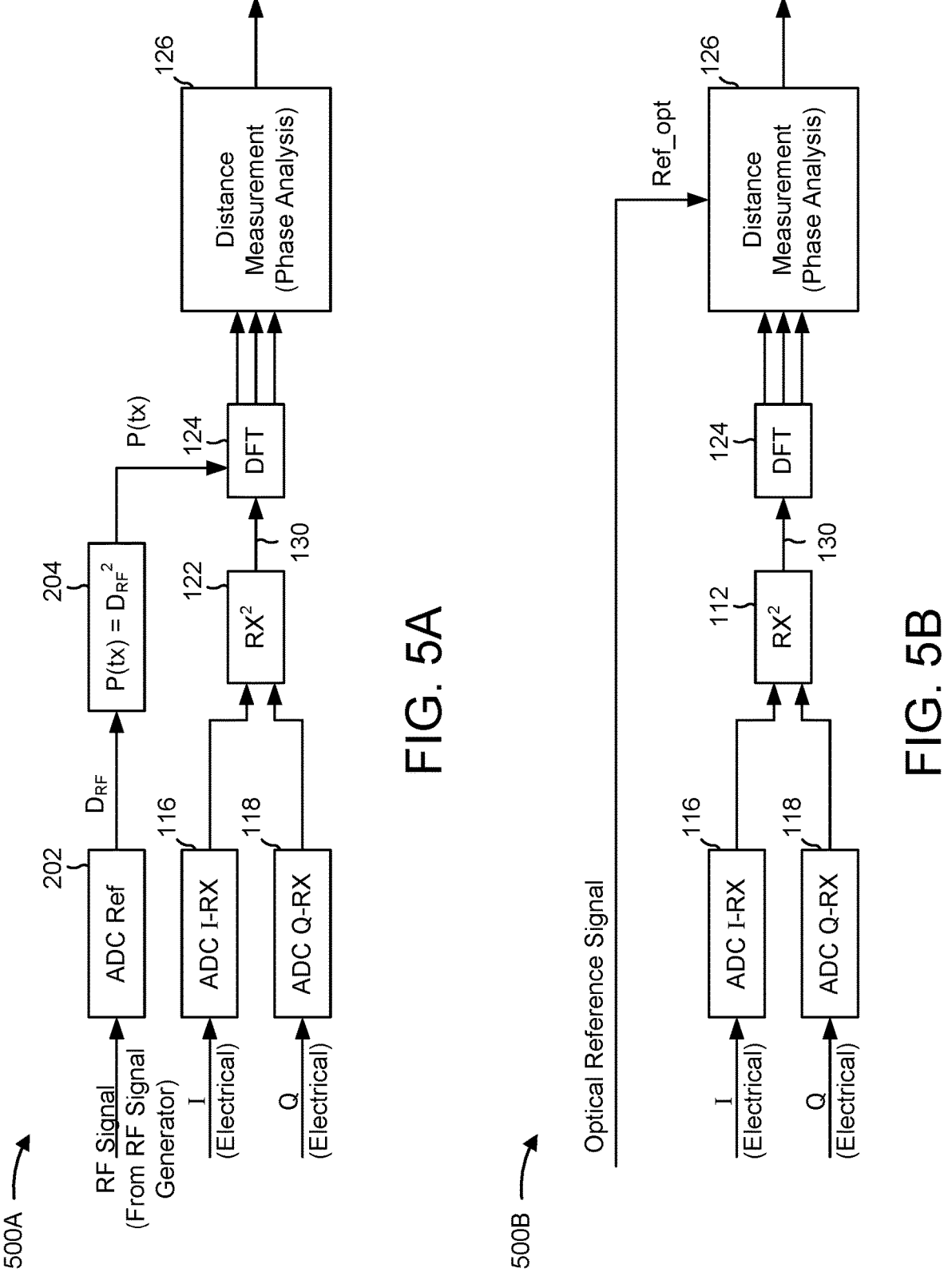
FIG. 5A shows a processing circuit according to one or more implementations.
FIG. 5B shows a processing circuit according to one or more implementations.

FIG. 5A shows a processing circuit 500A according to one or more implementations. The processing circuit 500A may be implemented in the receiver 104 described in connection with FIG. 1. The processing circuit 500A may be similar to the processing circuit 200 described in connection with FIG. 2, with an exception that the IQ skew correction circuit 120 is not included in the processing circuit 500A. As a result, the signal combiner 122 may receive a pair of IQ digital signals from the first ADC 116 and the second ADC 118.

The RF signal generator 108 may be configured to generate an RF pattern with a single tone or frequency that is half of a target frequency. Thus, the optical modulator 112 may generate the RF-encoded signal with an RF signal component that has a frequency that is half of the target frequency.

The Q optical signal at the optical IQ receiver 114 (e.g., coherent IQ receiver) may have, relative to the I optical signal, an optical phase ambiguity that changes over time. The signal combiner 122 may receive the pair of IQ digital signals and generate a power signal 130 having the target frequency. For example, the signal combiner 122 may square the I digital signal and the Q digital signal to generate a squared I digital signal and a squared Q digital signal, respectively, and sum the squared I digital signal and the squared Q digital signal to generate the power signal 130. As a result of squaring and summing the pair of IQ digital signals, the optical phase ambiguity between the I and Q digital signals may be removed such that the power signal 130 is not corrupted by the optical phase ambiguity.

Since the I and Q digital signals are time-domain signals, squaring the I and Q digital signals is mathematically equivalent with convolving a Fourier transform of the time-domain signal with itself (e.g., self-convolution). As a single sine wave, squaring the single sine wave results in a doubling of a frequency of the single sine wave. Since the RF signal generator 108 generates the RF pattern with a single tone or frequency that is half of the target frequency, the signal combiner 122 produces the power signal 130 at the target frequency as a result of doubling the frequency of the RF signal component encoded onto the pair of IQ digital signals.

The RF signal generator 108 may include a local oscillator configured to generate a local oscillator signal having the RF signal component. The transmitter 102 may provide a replica of the local oscillator signal as a reference oscillator signal to the processing circuit 500A. For example, reference ADC 202 may receive a replica of the local oscillator signal as an RF signal, and convert the RF signal into a digital signal DRF. The reference power signal generator 204 may square the digital signal DRF to generate a reference power signal P(tx). The reference power signal generator 204 may provide the reference power signal P(tx) to the DFT processing component 124, which extracts one or more reference RF signal components to be used by the distance measurement processing component 126 for phase difference determinations. The DFT processing component 124 may extract phase information from the reference power signal generator 204 that corresponds to a target frequency.

The DFT processing component 124 may extract phase information from the power signal 130 that corresponds to the target frequency. In some implementations, the DFT processing component 124 may determine a signal phase of a signal component at the target frequency. The DFT processing component 124 may provide the phase information or the signal phase to the distance measurement processing component 126. The distance measurement processing component 126 may determine a phase difference between the signal phase and the reference power signal P(tx) to determine a distance value to the object that corresponds to the target frequency.

In some implementations, the RF signal generator 108 may be configured to generate an RF pattern based on a plurality of RF signal components having different frequencies. Thus, the optical modulator 112 may generate the RF-encoded signal that is modulated with the RF pattern formed by the plurality of RF signal components.

The signal combiner 122 may receive the pair of IQ digital signals and generate a power signal 130 having a plurality of signal peaks. As a result of squaring and summing the pair of IQ digital signals, the optical phase ambiguity between the I and Q digital signals may be removed such that the power signal 130 is not corrupted by the optical phase ambiguity.

The DFT processing component 124 may extract phase information from the power signal 130 that corresponds to one or more target frequencies. In other words, the DFT processing component 124 may extract separate phase information for each target frequency. For example, the DFT processing component 124 may analyze the power signal 130 to determine a first signal phase corresponding to first signal peaks associated with a first target frequency and to determine a second signal phase corresponding to second signal peaks associated with a second target frequency that is different from the first target frequency. The DFT processing component 124 may analyze the power signal 130 by applying a DFT to the power signal 130 to convert the power signal 130 into a frequency domain representation of the power signal 130, and determine the first signal phase and the second signal phase based on the frequency domain representation of the power signal 130. Thus, the DFT processing component 124 may obtain the first signal phase at the first target frequency and may obtain the second signal phase at the second target frequency.

The DFT processing component 124 may provide the signal phase of each target frequency to the distance measurement processing component 126. The distance measurement processing component 126 may determine a first distance value based on a first phase difference between the first signal phase and the reference power signal P(tx), and may determine a second distance value based on a second phase difference between the second signal phase and the reference power signal P(tx). Thus, the distance measurement processing component 126 may determine a distance value for each target frequency by determining a phase difference for each target frequency.

Since the signal combiner 122 changes the locations of the signal peaks as a result of summing and squaring, the transmitter 102 may be configured to combine the plurality of RF signal components for encoding the optical signal such that the power signal 130 has the first signal peaks at the first target frequency and the second signal peaks at the second target frequency. In addition, the transmitter 102 may be configured to combine the plurality of RF signal components for encoding the optical signal such that aliased tones in the power signal 130 resulting from ADC subsampling are located outside each target frequency, including the first target frequency and the second target frequency.

As indicated above, FIG. 5A is provided as an example. Other examples may differ from what is described with regard to FIG. 5A. The number and arrangement of devices and components shown in FIG. 5A are provided as an example. In practice, there may be additional devices or components, fewer devices or components, different devices or components, or differently arranged devices or components than those shown in FIG. 5A.

FIG. 5B shows a processing circuit 500B according to one or more implementations. The processing circuit 500B may be similar to the processing circuit 500A described in connection with FIG. 5A, with an exception that an optical reference signal Ref_opt is provided to the distance measurement processing component 126. The optical reference signal may be derived from a portion split from the RF-encoded optical signal. The distance measurement processing component 126 may determine a phase difference between the optical reference signal and a signal phase of each target frequency for calculating distance information.

An advantage of using the optical signal reference Ref_opt for phase difference determinations is that unwanted time-of-flight variations that occur before the optical signal reference is split from the RF-encoded optical signal will not be measured in the time-of-flight to the object. For example, small changes in temperature that may alter an optical path length of an optical fiber may be removed from the time-of-flight measurement if the optical reference signal Ref_opt is split from the RF-encoded optical signal at or near an end of the optical fiber of the transmitter 102 just prior to transmitting the RF-encoded optical signal into free space.

As indicated above, FIG. 5B is provided as an example. Other examples may differ from what is described with regard to FIG. 5B. The number and arrangement of devices and components shown in FIG. 5B are provided as an example. In practice, there may be additional devices or components, fewer devices or components, different devices or components, or differently arranged devices or components than those shown in FIG. 5B.

Figure 6:
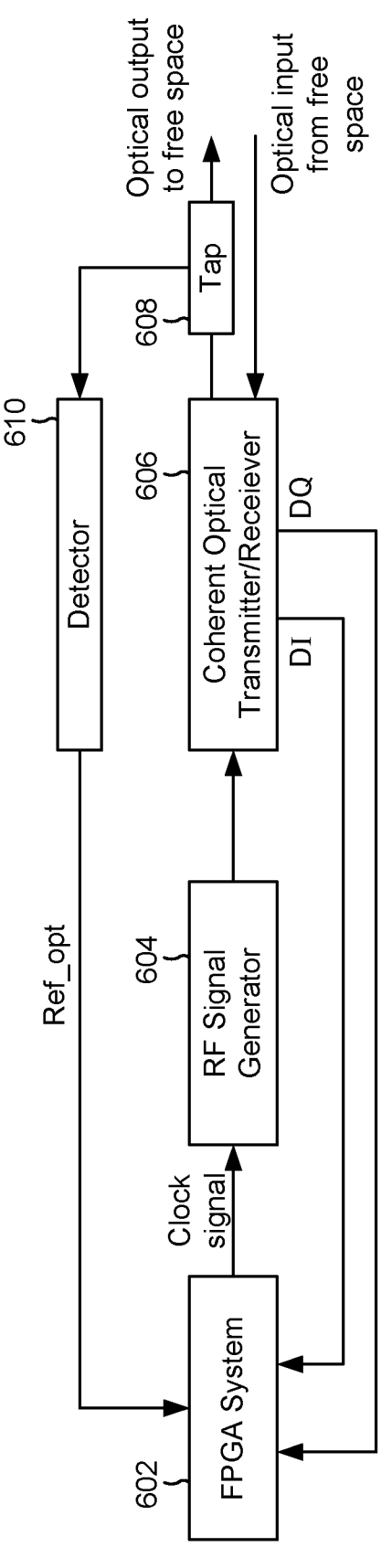
FIG. 6 shows an optical ranging system according to one or more implementations.

FIG. 6 shows an optical ranging system 600 according to one or more implementations. The optical ranging system 600 may include an FPGA system 602, an RF signal generator 604, a coherent optical transceiver 606, a signal tap 608, and a detector 610. The FPGA system 602 may include the controller 106 and signal processing components, such as the IQ skew correction circuit 120, the signal combiner 122, and the DFT processing component 124. In some implementations, the FPGA system 602 may also include the distance measurement processing component 126. The RF signal generator 604 may be similar to the RF signal generator 108. The coherent optical transceiver 606 may include the optical source 110, the optical modulator 112, the optical IQ receiver 114, the first ADC 116, and the second ADC 118.

The signal tap 608 (e.g., a splitter) may receive an RF-encoded optical signal from the optical modulator 112 and split a portion from the RF-encoded optical signal. The detector 610 may generate an optical reference signal Ref_opt based on the portion split from the RF-encoded optical signal. The detector 610 may be a coherent detector that generates the optical reference signal Ref_opt based on the portion split from the RF-encoded optical signal. Alternatively, the detector 610 may directly measure a modulation intensity of the portion split from the RF-encoded optical signal to generate the optical reference signal Ref_opt. The detector 610 may provide the optical reference signal Ref_opt to the FPGA system 602. The distance measurement processing component 126 may determine a phase difference between the optical reference signal Ref_opt and a signal phase of each target frequency for calculating distance information. In some implementations, the FPGA system 602 may derive a reference power signal from the optical reference signal Ref_opt, and may provide the reference power signal to the distance measurement processing component 126 for distance calculations.

As indicated above, FIG. 6 is provided as an example. Other examples may differ from what is described with regard to FIG. 6.

The following provides an overview of some Aspects of the present disclosure:

Aspect 1: An optical ranging system, comprising: a coherent IQ receiver configured to receive an RF-encoded optical signal comprising an RF signal component that has a frequency that is half of a target frequency, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal; a first ADC configured to convert the I electrical signal into an I digital signal encoded with the RF signal component; a second ADC configured to convert the Q electrical signal into a Q digital signal encoded with the RF signal component; and a processing circuit configured to generate a power signal having the target frequency, wherein the processing circuit is configured to square the I digital signal and the Q digital signal to generate a squared I digital signal and a squared Q digital signal, respectively, and sum the squared I digital signal and the squared Q digital signal to generate the power signal, and wherein the processing circuit is configured to determine a distance value based on a phase difference between the power signal and a reference power signal.

Aspect 2: The optical ranging system of Aspect 1, wherein the processing circuit is configured to, prior to squaring the I digital signal and the Q digital signal, correct an IQ skew between the I digital signal and the Q digital signal based on one or more IQ skew correction values.

Aspect 3: The optical ranging system of any of Aspects 1-2, wherein the processing circuit is configured to, prior to squaring the I digital signal and the Q digital signal, align a phase of the RF signal component of the I digital signal with a phase of the RF signal component of the Q digital signal.

Aspect 4: The optical ranging system of any of Aspects 1-3, further comprising: a coherent transmitter comprising a local oscillator configured to generate a local oscillator signal having the RF signal component, wherein the coherent transmitter is configured to provide a replica of the local oscillator signal as a reference oscillator signal to the processing circuit, wherein the processing circuit is configured to square the reference oscillator signal to generate the reference power signal.

Aspect 5: The optical ranging system of any of Aspects 1-4, further comprising: a coherent transmitter comprising a splitter configured to split a portion from the RF-encoded optical signal; and a detector configured to generate an optical reference signal based on the portion split from the RF-encoded optical signal, and provide the optical reference signal to the processing circuit, wherein the processing circuit is configured to derive the reference power signal from the optical reference signal.

Aspect 6: The optical ranging system of any of Aspects 1-5, wherein the RF-encoded optical signal is an AMCW signal.

Aspect 7: The optical ranging system of any of Aspects 1-6, wherein the optical ranging system is a LIDAR system, and the coherent IQ receiver is configured to receive the RF-encoded optical signal as a reflected optical signal from an object.

Aspect 8: An optical ranging system, comprising: a coherent IQ receiver configured to receive an RF-encoded optical signal encoded with an RF pattern based on a plurality of RF signal components having different frequencies, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal; a first ADC configured to convert the I electrical signal into an I digital signal; a second ADC configured to convert the Q electrical signal into a Q digital signal; and a processing circuit configured to square the I digital signal and the Q digital signal to generate a squared first I digital signal and a squared first Q digital signal, respectively, and sum the squared first I digital signal and the squared first Q digital signal to generate a power signal having a plurality of signal peaks, wherein the processing circuit is configured to analyze the power signal to determine a first signal phase corresponding to first signal peaks associated with a first target frequency and to determine a second signal phase corresponding to second signal peaks associated with a second target frequency that is different from the first target frequency, wherein the processing circuit is configured to determine a first distance value based on a first phase difference between the first signal phase and a reference power signal, and wherein the processing circuit is configured to determine a second distance value based on a second phase difference between the second signal phase and the reference power signal.

Aspect 9: The optical ranging system of Aspect 8, wherein the processing circuit is configured to analyze the power signal by applying a discrete Fourier transform to the power signal to convert the power signal into a frequency domain representation of the power signal, and determine the first signal phase and the second signal phase based on the frequency domain representation of the power signal.

Aspect 10: The optical ranging system of any of Aspects 8-9, wherein the processing circuit is configured to analyze the power signal by applying a discrete Fourier transform to the power signal to obtain the first signal phase at the first target frequency and to obtain the second signal phase at the second target frequency.

Aspect 11: The optical ranging system of any of Aspects 8-10, wherein the RF-encoded optical signal is an AMCW signal.

Aspect 12: The optical ranging system of any of Aspects 8-11, wherein the optical ranging system is a LIDAR system, and the coherent IQ receiver is configured to receive the RF-encoded optical signal as a backscattered optical signal from an object.

Aspect 13: The optical ranging system of any of Aspects 8-12, wherein the processing circuit is configured to, prior to squaring the I digital signal and the Q digital signal, correct an IQ skew between the I digital signal and the Q digital signal based on one or more first IQ skew correction values.

Aspect 14: The optical ranging system of Aspect 13, wherein each IQ skew correction value is a respective time interpolation value.

Aspect 15: The optical ranging system of any of Aspects 8-14, wherein the first target frequency defines a measurement distance of the optical ranging system, and the second target frequency defines a measurement resolution of the optical ranging system.

Aspect 16: The optical ranging system of any of Aspects 8-15, wherein the plurality of RF signal components are a plurality of sine waves that form a multi-sine wave, and wherein the RF-encoded optical signal comprises the multi-sine wave encoded onto an optical signal.

Aspect 17: The optical ranging system of any of Aspects 8-16, further comprising: a coherent transmitter configured to combine the plurality of RF signal components for encoding an optical signal such that the power signal has the first signal peaks at the first target frequency and the second signal peaks at the second target frequency.

Aspect 18: The optical ranging system of any of Aspects 8-17, further comprising: a coherent transmitter configured to combine the plurality of RF signal components for encoding an optical signal such that aliased tones in the power signal resulting from ADC subsampling are located outside the first target frequency and the second target frequency.

Aspect 19: The optical ranging system of any of Aspects 8-18, further comprising: a coherent transmitter comprising a signal generator configured to generate a multi-sine wave that forms the RF pattern and encode an optical signal with the multi-sine wave, wherein the coherent transmitter is configured to provide a replica of the multi-sine wave as a reference signal to the processing circuit, wherein the processing circuit is configured to square the reference signal to generate the reference power signal.

Aspect 20: An optical ranging system, comprising: a coherent IQ receiver configured to receive an RF-encoded optical signal encoded with an RF pattern based on a plurality of RF signal components having different frequencies, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal; a first ADC configured to convert the I electrical signal into an I digital signal; a second ADC configured to convert the Q electrical signal into a Q digital signal; and a processing circuit configured to apply a first time interpolation to at least one of the I digital signal or the Q digital signal based on at least one first IQ skew correction value to generate a first pair of IQ signals with a first IQ skew corresponding to a first target frequency compensated, wherein the processing circuit is configured to apply a second time interpolation to at least one of the I digital signal or the Q digital signal based on at least one second IQ skew correction value to generate a second pair of IQ signals with a second IQ skew corresponding to a second target frequency compensated, wherein the processing circuit is configured to square the first pair of IQ signals to generate a squared first I digital signal and a squared first Q digital signal, and sum the squared first I digital signal and the squared first Q digital signal to generate a first power signal having a first plurality of signal peaks, wherein the processing circuit is configured to square the second pair of IQ signals to generate a squared second I digital signal and a squared second Q digital signal, and sum the squared second I digital signal and the squared second Q digital signal to generate a second power signal having a second plurality of signal peaks, wherein the processing circuit is configured to analyze the first power signal to determine a first signal phase corresponding to first signal peaks associated with the first target frequency, wherein the processing circuit is configured to analyze the second power signal to determine a second signal phase corresponding to second signal peaks associated with the second target frequency, wherein the processing circuit is configured to determine a first distance value based on a first phase difference between the first signal phase and a reference power signal, and wherein the processing circuit is configured to determine a second distance value based on a second phase difference between the second signal phase and the reference power signal.

Aspect 21: The optical ranging system of Aspect 20, further comprising: a coherent transmitter configured to combine the plurality of RF signal components for encoding an optical signal such that the first power signal has the first signal peaks at the first target frequency and the second power signal has the second signal peaks at the second target frequency.

Aspect 22: A system configured to perform one or more operations recited in one or more of Aspects 1-21.

Aspect 23: An apparatus comprising means for performing one or more operations recited in one or more of Aspects 1-21.

Aspect 24: A non-transitory computer-readable medium storing a set of instructions, the set of instructions comprising one or more instructions that, when executed by a device, cause the device to perform one or more operations recited in one or more of Aspects 1-21.

Aspect 25: A computer program product comprising instructions or code for executing one or more operations recited in one or more of Aspects 1-21.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When a component or one or more components (e.g., a laser emitter or one or more laser emitters) is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical ranging system, comprising:

a coherent IQ receiver configured to receive a radio frequency (RF)-encoded optical signal comprising an RF signal component that has a frequency that is half of a target frequency, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal;

a first analog-to-digital converter (ADC) configured to convert the I electrical signal into an I digital signal encoded with the RF signal component;

a second ADC configured to convert the Q electrical signal into a Q digital signal encoded with the RF signal component; and a processing circuit configured to generate a power signal having the target frequency, wherein the processing circuit is configured to square the I digital signal and the Q digital signal to generate a squared I digital signal and a squared Q digital signal, respectively, and sum the squared I digital signal and the squared Q digital signal to generate the power signal, and wherein the processing circuit is configured to determine a distance value based on a phase difference between the power signal and a reference power signal.

2. The optical ranging system of claim 1, wherein the processing circuit is configured to, prior to squaring the I digital signal and the Q digital signal, correct an IQ skew between the I digital signal and the Q digital signal based on one or more IQ skew correction values.

3. The optical ranging system of claim 1, wherein the processing circuit is configured to, prior to squaring the I digital signal and the Q digital signal, align a phase of the RF signal component of the I digital signal with a phase of the RF signal component of the Q digital signal.

4. The optical ranging system of claim 1, further comprising:

a coherent transmitter comprising a local oscillator configured to generate a local oscillator signal having the RF signal component, wherein the coherent transmitter is configured to provide a replica of the local oscillator signal as a reference oscillator signal to the processing circuit, wherein the processing circuit is configured to square the reference oscillator signal to generate the reference power signal.

5. The optical ranging system of claim 1, further comprising:

a coherent transmitter comprising a splitter configured to split a portion from the RF-encoded optical signal; and a detector configured to generate an optical reference signal based on the portion split from the RF-encoded optical signal, and provide the optical reference signal to the processing circuit, wherein the processing circuit is configured to derive the reference power signal from the optical reference signal.

6. The optical ranging system of claim 1, wherein the RF-encoded optical signal is an amplitude-modulated continuous-wave (AMCW) signal.

7. The optical ranging system of claim 1, wherein the optical ranging system is a light detection and ranging (LIDAR) system, and the coherent IQ receiver is configured to receive the RF-encoded optical signal as a reflected optical signal from an object.

8. An optical ranging system, comprising:

a coherent IQ receiver configured to receive a radio frequency (RF)-encoded optical signal encoded with an RF pattern based on a plurality of RF signal components having different frequencies, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal;

a first analog-to-digital converter (ADC) configured to convert the I electrical signal into an I digital signal;

a second ADC configured to convert the Q electrical signal into a Q digital signal; and a processing circuit configured to square the I digital signal and the Q digital signal to generate a squared first I digital signal and a squared first Q digital signal, respectively, and sum the squared first I digital signal and the squared first Q digital signal to generate a power signal having a plurality of signal peaks, wherein the processing circuit is configured to analyze the power signal to determine a first signal phase corresponding to first signal peaks associated with a first target frequency and to determine a second signal phase corresponding to second signal peaks associated with a second target frequency that is different from the first target frequency, wherein the processing circuit is configured to determine a first distance value based on a first phase difference between the first signal phase and a reference power signal, and wherein the processing circuit is configured to determine a second distance value based on a second phase difference between the second signal phase and the reference power signal.

9. The optical ranging system of claim 8, wherein the processing circuit is configured to analyze the power signal by applying a discrete Fourier transform to the power signal to convert the power signal into a frequency domain representation of the power signal, and determine the first signal phase and the second signal phase based on the frequency domain representation of the power signal.

10. The optical ranging system of claim 8, wherein the processing circuit is configured to analyze the power signal by applying a discrete Fourier transform to the power signal to obtain the first signal phase at the first target frequency and to obtain the second signal phase at the second target frequency.

11. The optical ranging system of claim 8, wherein the RF-encoded optical signal is an amplitude-modulated continuous-wave (AMCW) signal.

12. The optical ranging system of claim 8, wherein the optical ranging system is a light detection and ranging (LIDAR) system, and the coherent IQ receiver is configured to receive the RF-encoded optical signal as a backscattered optical signal from an object.

13. The optical ranging system of claim 8, wherein the processing circuit is configured to, prior to squaring the I digital signal and the Q digital signal, correct an IQ skew between the I digital signal and the Q digital signal based on one or more first IQ skew correction values.

14. The optical ranging system of claim 13, wherein each IQ skew correction value is a respective time interpolation value.

15. The optical ranging system of claim 8, wherein the first target frequency defines a measurement distance of the optical ranging system, and the second target frequency defines a measurement resolution of the optical ranging system.

16. The optical ranging system of claim 8, wherein the plurality of RF signal components are a plurality of sine waves that form a multi-sine wave, and wherein the RF-encoded optical signal comprises the multi-sine wave encoded onto an optical signal.

17. The optical ranging system of claim 8, further comprising:

a coherent transmitter configured to combine the plurality of RF signal components for encoding an optical signal such that the power signal has the first signal peaks at the first target frequency and the second signal peaks at the second target frequency.

18. The optical ranging system of claim 8, further comprising:

a coherent transmitter configured to combine the plurality of RF signal components for encoding an optical signal such that aliased tones in the power signal resulting from ADC subsampling are located outside the first target frequency and the second target frequency.

19. The optical ranging system of claim 8, further comprising:

a coherent transmitter comprising a signal generator configured to generate a multi-sine wave that forms the RF pattern and encode an optical signal with the multi-sine wave, wherein the coherent transmitter is configured to provide a replica of the multi-sine wave as a reference signal to the processing circuit, wherein the processing circuit is configured to square the reference signal to generate the reference power signal.

20. An optical ranging system, comprising:

a coherent IQ receiver configured to receive a radio frequency (RF)-encoded optical signal encoded with an RF pattern based on a plurality of RF signal components having different frequencies, wherein the coherent IQ receiver comprises a coherent IQ demodulator configured to split the RF-encoded optical signal into an in-phase (I) optical signal and a quadrature (Q) optical signal that has, relative to the I optical signal, an optical phase ambiguity that changes over time, and wherein the coherent IQ receiver is configured to generate an I electrical signal corresponding to the I optical signal, and generate a Q electrical signal corresponding to the Q optical signal;

a first analog-to-digital converter (ADC) configured to convert the I electrical signal into an I digital signal;

a second ADC configured to convert the Q electrical signal into a Q digital signal; and a processing circuit configured to apply a first time interpolation to at least one of the I digital signal or the Q digital signal based on at least one first IQ skew correction value to generate a first pair of IQ signals with a first IQ skew corresponding to a first target frequency compensated, wherein the processing circuit is configured to apply a second time interpolation to at least one of the I digital signal or the Q digital signal based on at least one second IQ skew correction value to generate a second pair of IQ signals with a second IQ skew corresponding to a second target frequency compensated, wherein the processing circuit is configured to square the first pair of IQ signals to generate a squared first I digital signal and a squared first Q digital signal, and sum the squared first I digital signal and the squared first Q digital signal to generate a first power signal having a first plurality of signal peaks, wherein the processing circuit is configured to square the second pair of IQ signals to generate a squared second I digital signal and a squared second Q digital signal, and sum the squared second I digital signal and the squared second Q digital signal to generate a second power signal having a second plurality of signal peaks, wherein the processing circuit is configured to analyze the first power signal to determine a first signal phase corresponding to first signal peaks associated with the first target frequency, wherein the processing circuit is configured to analyze the second power signal to determine a second signal phase corresponding to second signal peaks associated with the second target frequency, wherein the processing circuit is configured to determine a first distance value based on a first phase difference between the first signal phase and a reference power signal, and wherein the processing circuit is configured to determine a second distance value based on a second phase difference between the second signal phase and the reference power signal.

21. The optical ranging system of claim 20, further comprising:

a coherent transmitter configured to combine the plurality of RF signal components for encoding an optical signal such that the first power signal has the first signal peaks at the first target frequency and the second power signal has the second signal peaks at the second target frequency.

* * * * *